(12) United States Patent
Zhao et al.

(10) Patent No.: US 10,063,519 B1
(45) Date of Patent: Aug. 28, 2018

(54) AUTOMATICALLY OPTIMIZING WEB APPLICATION FIREWALL RULE SETS

(71) Applicant: VERISIGN, INC., Reston, VA (US)

(72) Inventors: Yujie Zhao, Centreville, VA (US); Steven Bowers, Herndon, VA (US); Sivasankar Subramanian, Herndon, VA (US); Suresh Bhogavilli, Gaithersburg, MD (US)

(73) Assignee: VERISIGN, INC., Reston, VA (US)

(*) Notice: Subject to any disclaimer, the term of this patent is extended or adjusted under 35 U.S.C. 154(b) by 0 days.

(21) Appl. No.: 15/472,200

(22) Filed: Mar. 28, 2017

(51) Int. Cl.
*H04L 29/06* (2006.01)

(52) U.S. Cl.
CPC ........ *H04L 63/0263* (2013.01); *H04L 63/101* (2013.01); *H04L 63/20* (2013.01); *H04L 67/42* (2013.01)

(58) Field of Classification Search
CPC ... H04L 63/0263; H04L 63/101; H04L 63/20; H04L 67/42
See application file for complete search history.

(56) References Cited

U.S. PATENT DOCUMENTS

| | | | | |
|---|---|---|---|---|
| 7,177,896 B2* | 2/2007 | Kasvand | .............. | G06F 11/2257 709/200 |
| 7,647,622 B1* | 1/2010 | Sobel | ................... | H04L 63/1425 709/229 |
| 7,665,128 B2* | 2/2010 | Yang | ................... | H04L 63/0263 726/11 |
| 7,966,655 B2* | 6/2011 | Acharya | .............. | H04L 63/0263 726/11 |
| 8,069,481 B2* | 11/2011 | Judge | ................... | H04L 63/0263 709/224 |
| 8,353,021 B1* | 1/2013 | Satish | ................. | H04L 63/0263 709/202 |
| 8,589,727 B1* | 11/2013 | Fletcher | .............. | G06F 11/3006 714/13 |
| 8,893,253 B2* | 11/2014 | Cianfrocca | ......... | H04L 63/0245 726/11 |
| 9,473,457 B2* | 10/2016 | Koved | ................ | H04L 63/0263 |

(Continued)

OTHER PUBLICATIONS

Krueger et al., "TokDoc: A Self-Healing Web Application Firewall", Mar. 22-26, 2010, ACM, pp. 1846-1853.*

*Primary Examiner* — Matthew Smithers
(74) *Attorney, Agent, or Firm* — Artegis Law Group, LLP (57) ABSTRACT

In one embodiment, a rule optimization application optimizes a rule set that a firewall applies to protect web applications from on-line attacks. The rule optimization application identifies a completed filtering operation that is associated with applying a rule to a request to access a web application received from a client. The rule optimization application then estimates a quality score for the rule based on the completed filtering operation and a reputation value for the client that indicates a likelihood that the client is legitimate. Subsequently, the rule optimization application determines that the quality score does not satisfy a predetermined quality criterion and disables the rule in the rule set to generate a updated, optimized rule set for the web application. Advantageously, the quality criterion may configure the rule optimization application to automatically update the rule set to reduce the number of legitimate requests that are blocked by the rule set.

20 Claims, 3 Drawing Sheets

(56) References Cited

U.S. PATENT DOCUMENTS

| | | | |
|---|---|---|---|
| 2005/0262554 A1* | 11/2005 | Brooks | H04L 63/0263 726/11 |
| 2008/0148380 A1* | 6/2008 | Abzarian | H04L 63/0263 726/11 |
| 2010/0211658 A1* | 8/2010 | Hoogerwerf | H04L 63/20 709/221 |
| 2012/0278851 A1* | 11/2012 | Dan | H04L 41/0893 726/1 |
| 2013/0097701 A1* | 4/2013 | Moyle | H04L 63/20 726/22 |
| 2013/0247167 A1* | 9/2013 | Paul | H04L 63/20 726/11 |
| 2016/0173510 A1* | 6/2016 | Harris | H04L 63/20 726/23 |
| 2016/0191466 A1* | 6/2016 | Pernicha | H04L 63/20 726/1 |
| 2016/0315911 A1* | 10/2016 | Gupta | G06F 17/30589 |
| 2017/0034199 A1* | 2/2017 | Zaw | H04L 63/1433 |
| 2017/0201548 A1* | 7/2017 | Kinder | H04L 63/20 |

\* cited by examiner

AUTOMATICALLY OPTIMIZING WEB APPLICATION FIREWALL RULE SETS

BACKGROUND OF THE INVENTION

Field of the Invention

Embodiments of the present invention relate generally to computer networks and, more specifically, to automatically optimizing web application firewall rule sets.

Description of the Related Art

As is well-known, web applications are vulnerable to a variety of on-line attacks from malicious clients that attempt to disable the web applications or obtain unauthorized data via the web applications. In an attempt to make web applications more secure, web application firewalls are oftentimes implemented. A web application firewall provides a layer of protection between clients and web servers that host the web applications. In operation, many web application firewalls filter requests to and responses from the web applications based on a negative assertion rule set. In this type of implementation, upon receiving a request or response, a typical web application firewall performs pattern matching operations between the request or the response and the rule set. If the web application firewall detects a pattern match between a request or a response and a rule included in the rule set, then the web application firewall blocks the request or response. If, however, the web application firewall does not detect any pattern matches between the request or the response and the rules in the applicable rule set, then the web application firewall forwards the request to the associated web server or the response to the associated client.

One limitation of filtering requests and responses based on a negative assertion rule set is that creating and maintaining a reliable rule set may be highly impractical, if not impossible. In a typical approach, a system administrator initially attempts to generate a viable negative assertion rule set that includes rules that match malicious requests, responses that leak sensitive data, and likely variations thereof, and does not include rules that match legitimate requests and legitimate responses. Over time, however, the web application firewall may be configured to protect new web applications. Further, the protected web applications may be modified to change the type and format of data expected in requests and/or returned in responses. As a result of these types of changes, if the applicable rule set is not updated, then some number of legitimate requests and legitimate responses may end up matching the rules included in the initial rule set and be blocked by the web application firewall. In fact, the number of blocked legitimate requests may dramatically increase over time without proper rule set updates.

Because blocking legitimate requests and legitimate responses reduces the ability of web applications to service clients, system administrators have to update the negative assertion rule sets on a periodic basis. This process is predominantly manual. First, the system administrator inspects a log of the filtering operations performed by the web application firewall and attempts to identify erroneous blocking operations. The system administrator then has to modify the rule set to reduce the number of erroneous blocking operations. Because this process is manual and tedious, the time and resources required to update negative assertion rule sets can be prohibitive. For example, making appropriate updates to a rule set for a web application firewall that protects multiple web applications can take several system administrators several weeks to complete. Further, until the rule set updates are completed, the web application firewall may continue to block legitimate requests and legitimate responses. In many instances, the numbers of blocked legitimate requests and responses during these interim periods can be unacceptably high.

Other conventional approaches to protecting web applications from on-line attacks involve similarly time-consuming manual setup and maintenance operations. In particular, the time and resources required to adequately protect web applications without significantly reducing the ability of the web applications to provide services can be prohibitively high. For example, some web application firewalls filter requests and responses based on positive assertion catalogs that specify patterns associated with legitimate requests and legitimate responses. Creating and maintaining a positive assertion catalog for a web application can actually require more time and resources than would be required to create and maintain a negative assertion rule set for the same web application.

As the foregoing illustrates, what is needed in the art are more effective techniques for configuring a rule set to protect web applications from on-line attacks.

SUMMARY OF THE INVENTION

One embodiment of the present invention sets forth a method for configuring a rule set to protect web applications from on-line attacks. The method includes identifying a first completed filtering operation associated with applying a first rule included in the rule set to a first request to access a web application received from a first client; computing a first quality score associated with the first rule based on the first completed filtering operation and a first reputation value indicating a likelihood that the first client is legitimate; determining that the first quality score indicates that the first rule does not satisfy a quality criterion; and disabling the first rule in the rule set to generate a second rule set.

Further embodiments provide, among other things, a computer-readable medium and a system configured to implement the method set forth above.

One advantage of the disclosed techniques is that implementing the disclosed techniques may optimize the rule set based on any criterion that is related to the type of filtering operations and the reputation of clients. In particular, the disclosed techniques may be configured to automatically update a rule set to reduce the number of legitimate requests that are blocked by the rule set. By contrast, conventional approaches to updating rule sets involve time-consuming manual setup and maintenance operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
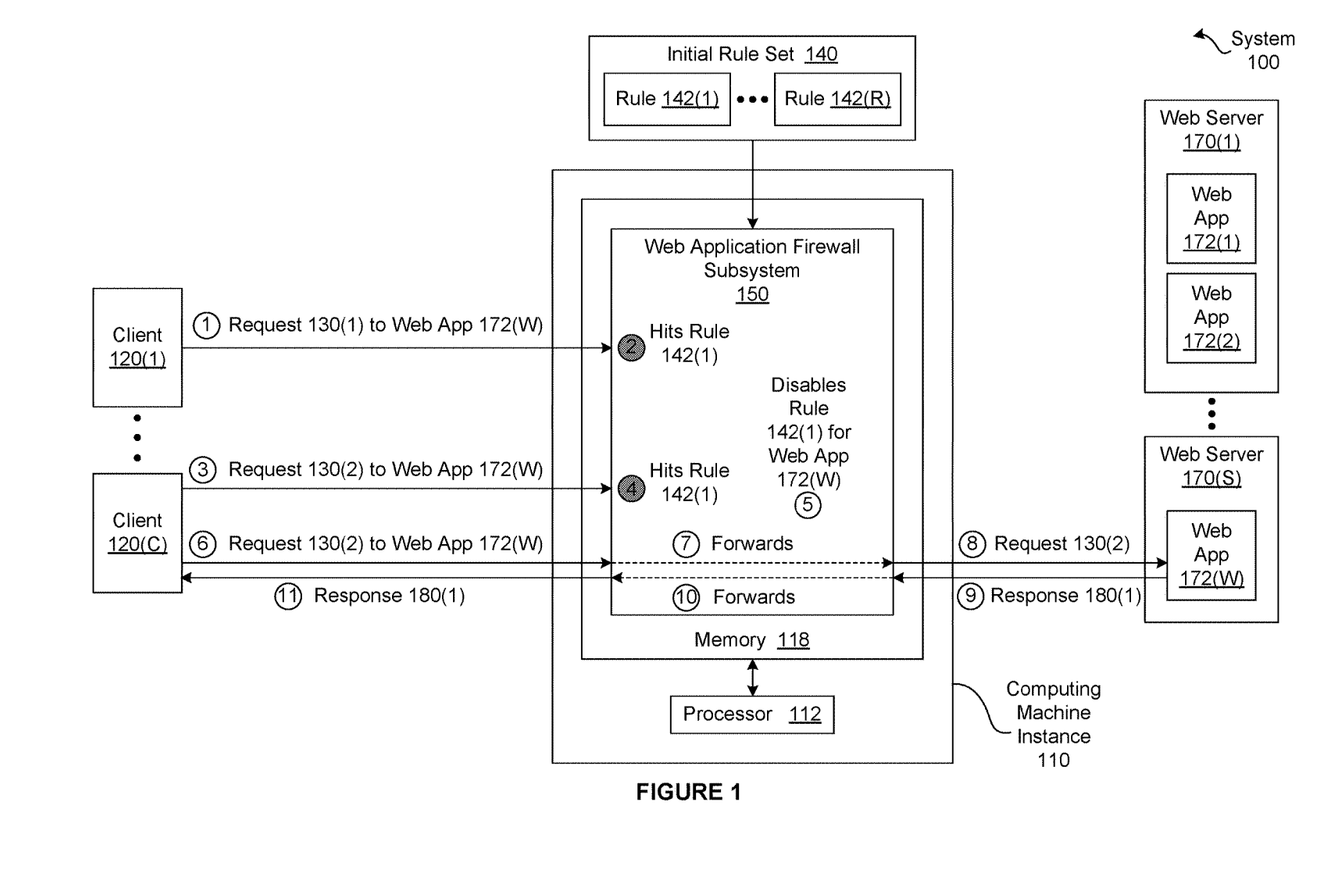
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, any number of clients 120, any number of web servers 170, and a computing machine instance 110. Each of the web servers 170 hosts any number of any web applications 172. For explanatory purposes, multiple instances of like objects are denoted with reference numbers identifying the object and parenthetical numbers identifying the instance where needed.

Each of the clients 120 may be any entity that is capable of transmitting requests 130 to access the web applications 172 over the Internet. For example, the client 120(1) could be a machine or a process executing on a machine. Each of the web applications 172 comprises a collection of related resources that is capable of receiving the requests 130 and, optionally, transmitting responses 180 over the Internet. The related resources may include any number, type, and combination of read-only content and executable applications. A web application 172 that includes only read-only content is also commonly referred to as a "website."

As persons skilled in the art will recognize, the web applications 172 are vulnerable to a variety of on-line attacks. Examples of such on-line attacks include Structured Query Language (SQL) injection attacks, cross-site scripting attacks, and Distributed Denial of Service (DDoS) attacks, to name a few. To reduce the likelihood that an on-line attack successfully exploits any of the vulnerabilities of the web applications 172, the computing machine instance 110 includes a web application firewall subsystem 150.

As shown, the web application subsystem 150 comprises a software program that generally resides within a memory 118 and is executed by a processor 112. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 118 stores content, such as software applications and data, for use by the processor 112 of the computing machine instance 110. The memory 118 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 118. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In alternate embodiments, the computing machine instance 110 may include any number of types of processors 112 and any number and types of memories 118 in any combination. The processor 112 and the memory 118 may be implemented in any technically feasible fashion. For example, and without limitation, in various embodiments, the processor 112 and/or the memory 118 may be implemented as a stand-alone chip or as part of a more comprehensive solution that is implemented as an application-specific integrated circuit (ASIC) or a system-on-a-chip (SoC).

In some embodiments, the computing machine instance 110 may interact with a cloud (e.g., encapsulated shared resources, software, data, etc.) to perform operations associated with the web application firewall subsystem 150. In alternate embodiments, the computing machine instance 110, the processor 112, and/or the memory 118 may be replaced with any type of distributed computer system or cloud computing environment.

In general, the web application subsystem 150 implements a layer of protection between the clients 120 and the web servers 170 that host the web applications 172 based on any number of rules 142 included in any number of negative assertion rule sets. Initially, upon receiving the request 130 to access the web application 172, the web application firewall subsystem 110 performs pattern matching operations between the request 130 and the rules 142 included in an initial rule set 140. If the web application firewall subsystem 150 detects a pattern match between the request 130 and any of the rules 142, then the web application firewall subsystem 110 blocks the request 130. Consequently, the web application 172 does not receive the request 130. If, however, the web application firewall subsystem 150 does not detect any pattern matches between the request 130 and the rules 142, then the web application firewall subsystem 110 forwards the request 130 to the web server 170 that hosts the web application 172.

Similarly, upon receiving the response 180 from the web application 172 to the client 120, the web application firewall subsystem 150 performs pattern matching operations between the response 180 and the rules 142. If the web application firewall subsystem 150 detects a pattern match between the response 180 and any of the rules 142, then the web application firewall subsystem 150 blocks the response 180. Consequently, the client 120 does not receive the response 180. If, however, the web application firewall subsystem 150 does not detect any pattern matches between the response 180 and the rules 142, then the web application firewall subsystem 150 forwards the response 180 to the client 120.

In alternate embodiments, the web application firewall subsystem 150 may perform any number and type of filtering operations on any amount and type of traffic associated with the web applications 172 based on any number and type of the rules 142. As referred to herein, "traffic" includes, without limitation, the requests 130 and the responses 180. Further, "filtering" includes, without limitation, any number and type of analysis, blocking, and logging operations that the web application firewall subsystem 110 performs on the traffic. For example, "filtering" includes, without limitation, performing blocking operation(s), performing logging operation(s), modifying the request 130 or the response 180, and generating the response 180 to the request 130 without relaying the request 130 to the web server 170, to name a few. In some alternate embodiments the web application firewall subsystem 150 may be configured to operate in a "detect" mode. In the detect mode, the web application firewall subsystem 150 logs the traffic and any rule hits, but does not block any traffic based on the rule hits. As referred to herein, if the request 130 or the response 180 matches the rule 142, then the request 130 or the response 180 "hits" the rule 142.

As persons skilled in the art will recognize, creating and maintaining a reliable rule set for a conventional web application firewall may be highly impractical, if not impossible. In a typical approach, a system administrator initially attempts to generate a viable negative assertion rule set that includes rules that match malicious requests, responses that leak sensitive data, and likely variations thereof, and does not include rules that match legitimate requests and legitimate responses. Over time, however, the conventional web application firewall may be configured to protect new web applications. Further, the protected web applications may be modified to change the type and format of data expected in requests and/or returned in responses. As a result of these types of changes, if the applicable rule set is not updated, then some number of legitimate requests and legitimate responses may end up matching the rules included in the initial rule set and be blocked by the conventional web application firewall. In fact, the number of blocked legitimate requests may dramatically increase over time without proper rule set updates.

Because blocking legitimate requests and legitimate responses reduces the ability of web applications to service clients, system administrators have to update the negative assertion rule sets on a periodic basis. This process is predominantly manual. First, the system administrator inspects a log of the filtering operations performed by the conventional web application firewall and attempts to identify erroneous blocking operations. The system administrator then has to modify the rule set to reduce the number of erroneous blocking operations. Because this process is manual and tedious, the time and resources required to update negative assertion rule sets can be prohibitive. For example, making appropriate updates to a rule set for a conventional web application firewall that protects multiple web applications can take several system administrators several weeks to complete. Further, until the rule set updates are completed, the conventional web application firewall may continue to block legitimate requests and legitimate responses. In many instances, the numbers of blocked legitimate requests and responses during these interim periods can be unacceptably high.

Automatically Optimizing Rule Sets

To optimize the time required to update the rules 142 and the ability of the web applications 172 to service the clients 110, the web application firewall subsystem 150 automatically generates and maintains a different rule set for each of the web applications 172. The application rule set (not shown in FIG. 1) that is associated with a given web application 172 indicates whether each of the rules 142 included in the initial rule set 140 is enabled for the web application 172. If the rule 142 is enabled for the web application 172, then the web application firewall subsystem 140 performs filtering operations on the requests 130 to and responses 180 from the web application 172 based on the rule 142. If, however, the rule 142 is not enabled for the web application 172, then the web application firewall subsystem 140 does not perform filtering operations on the requests 130 to and responses 180 from the web application 172 based on the rule 142.

Initially, the web application firewall subsystem 150 enables all of the rules 142 for all of the web applications 172. As the web application firewall subsystem 150 operates, the web application firewall subsystem 150 logs traffic data associated with the traffic to and from the web applications 172. The web application firewall subsystem 150 also logs filtering data associated with the filtering operations that the web application firewall subsystem 150 performs on the traffic. Further, for each of clients 120, the web application firewall subsystem 150 estimates a reputation based on the traffic data and the filtering data. The reputation of a given client 120 estimates a likelihood that the client 120 is legitimate.

Periodically, for each of the web applications 172, the web application firewall subsystem 150 estimates fallibilities of the rules 142 based on the reputations and the filtering data. The fallibility of a given rule 142 for a given web application 172 estimates a likelihood that traffic associated with the web application 172 that hits the rule 142 is legitimate traffic. If the fallibility exceeds a predetermined threshold, then the web applicable firewall subsystem 150 disables the rule 142 in the application rule set associated with the web application 172.

For explanatory purposes only, FIG. 1 depicts a series of events using a series of numbered bubbles. In the context of the depicted series of events, the application rule set associated with the web application 172(W) initially includes the enabled rule 142(1), and the reputations of the clients 120 are initialized to relatively high values. First, as depicted with the bubble numbered 1, the client 120(1) attempts to transmit the request 130(1) to the web application 172(W). As depicted with the bubble numbered 2, the web application firewall subsystem 150 receives the request 130(1), determines that the request 130(1) hits the rule 142(1), and blocks the request 130(1). Because the request 130(1) hits the rule 142(1), the web application firewall subsystem 150 reduces the reliability of the client 120(1). However, the reputation of the client 120(1) is still relatively high.

Subsequently, as depicted with the bubble numbered 3, the client 120(C) attempts to transmit the request 130(2) to the web application 172(W). As depicted with the bubble numbered 4, the web application firewall subsystem 150 receives the request 130(2), determines that the request 130(2) hits the rule 142(1), and blocks the request 130(2). Because the request 130(2) hits the rule 142(1), the web application firewall subsystem 150 reduces the reliability of the client 120(C). However, the reputation of the client 120(C) is still relatively high.

After a predetermined interval of time that is configured via an update frequency (not shown in FIG. 1), the web application firewall subsystem 150 analyzes the traffic data and the filtering data. For the web application 172(W), because the reputation of the clients 120 that hit the rule 142(1) during the preceding interval of time are relatively high, the web application firewall subsystem 150 computes a relatively high fallibility for the rule 142(1). As depicted with the bubble numbered 5, the web application firewall subsystem 150 then determines that the fallibility of the rule 142(1) for the web application 172(W) exceeds a predetermined fallibility threshold and, consequently, disables the rule 142(1) for the web application 172(W).

Subsequently, as depicted with the bubble numbered 6, the client 120(C) attempts to re-transmit the request 130(2)

to the web application 172(W). As depicted with the bubble numbered 7, the web application firewall subsystem 150 receives the re-transmitted request 130(2) and determines that the re-transmitted request 130(2) does not hit any of the enabled rules 142 for the web application 172(W). Consequently, as depicted with the bubble numbered 8, the web application firewall subsystem 150 forwards the request 130(2) to the web server 170(S) that hosts the web application 172(W).

As depicted with the bubble numbered 9, the web server 180 then attempts to transmits the response 180(1) corresponding to the request 130(3) to the client 120(C). As depicted with the bubble numbered 10, the web application firewall subsystem 150 receives the response 180(1), determines that the response 180(1) does not hit any of the enabled rules 142 for the web application 172(W), and forwards the response 180(1) to the client 120(C). In addition, if the response 180(1) indicates a successful status, then the web application firewall subsystem 150 increases the reliability of the client 120(C). Finally, as depicted with the bubble numbered 11, the client 120(C) receives the response 180(1) to the re-transmitted request 130(2).

As the previous example illustrates, by automatically optimizing the rules 142 that are enabled for each of the web applications 172, the web application firewall subsystem 150 efficiently reduces the number of legitimate requests 130 and legitimate responses 180 that the web application firewall subsystem 150 erroneously blocks. By contrast, configuring a conventional web application firewall to disable a rule 142 that matches legitimate requests 130 and legitimate responses 180 would typically require time-consuming, manual analysis and modification operations.

Note that the techniques described herein are illustrative rather than restrictive, and may be altered without departing from the broader spirit and scope of the invention. Many modifications and variations on the functionality provided by the web application firewall subsystem 150 will be apparent to those of ordinary skill in the art without departing from the scope and spirit of the described embodiments.

In particular, embodiments of the current invention includes any firewall application that modifies filtering operations based on analyzing previous traffic and/or completed filtering operations. For example, in some embodiments, a firewall application may generate or modify a whitelist or a blacklist based on the reputations and/or the fallibilities. As referred to herein, a whitelist specifies legitimate clients or legitimate websites, and a blacklist specifies malicious clients or malicious websites.

In various embodiments, any number of the techniques may be implemented while other techniques may be omitted in any technically feasible fashion that automatically configures the filtering operations performed by the web application firewall subsystem 150. For instance, in some embodiments, the web application firewall subsystem 150 may be configured to maintain a single rule list and perform filtering operations for all of the web applications 172 based on the single rule list. In other embodiments, instead of computing the reputations of the clients 120, the web application firewall subsystem 150 may be configured to determine the reputation of the clients 120 based on a whitelist or a blacklist.

Figure 2:
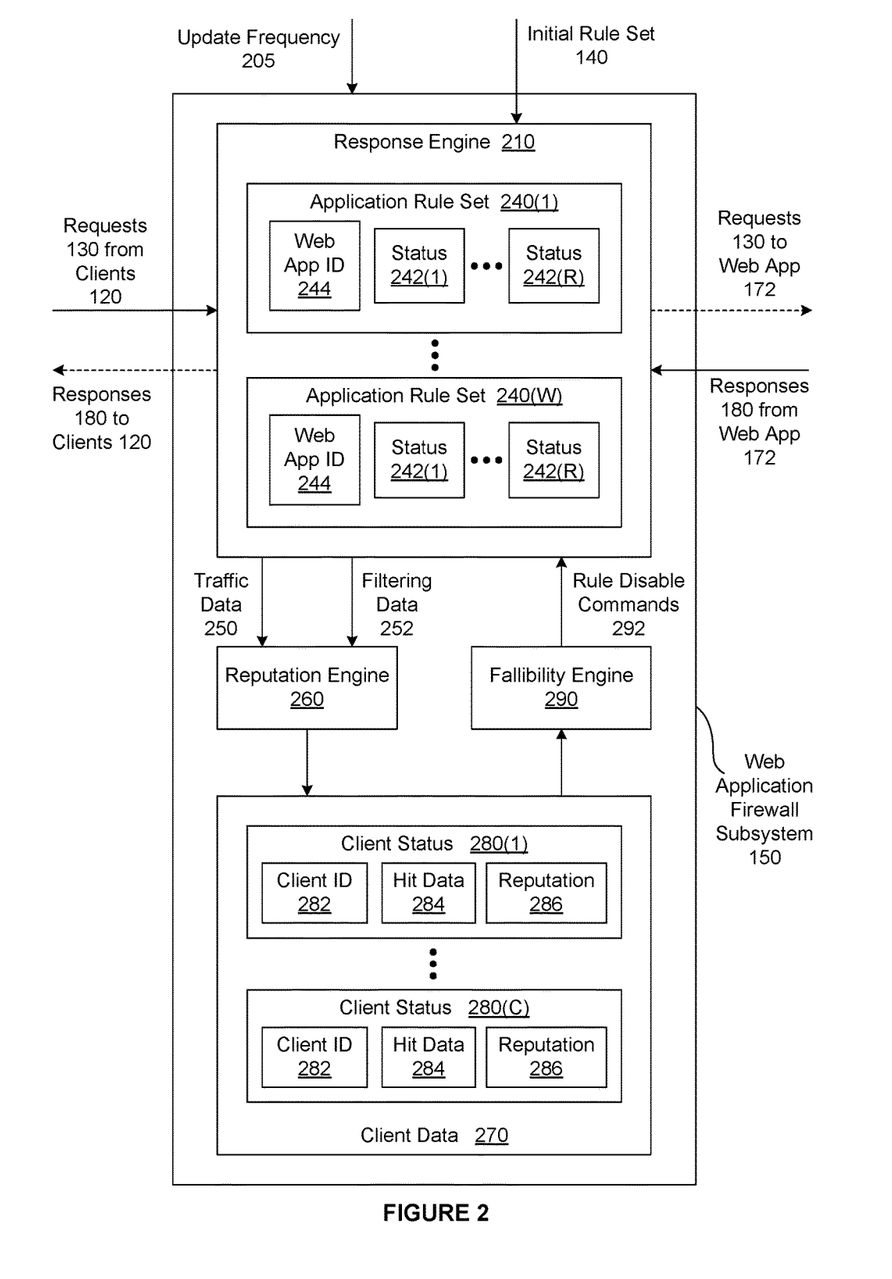
FIG. 2 is a more detailed illustration of the web application firewall subsystem of FIG. 1, according to various embodiments of the present invention.

FIG. 2 is a more detailed illustration of the web application firewall subsystem 150 of FIG. 1, according to various embodiments of the present invention. As shown, the web application firewall subsystem 150 includes, without limitation, a response engine 210, a reputation engine 260, client data 270, and a fallibility engine 290. The web application firewall subsystem 150 is configured via the initial rule set 140 of FIG. 1 and an update frequency 205.

As shown in FIG. 1, the initial rule set 140 includes, without limitation, the rules 142 that specify initial negative assertion filtering behavior. Referring back now to FIG. 2, upon receiving the initial rule set 140, the response engine 260 generates application rule sets 240. More specifically, for each of the web applications 172, the response engine 210 generates an associated application rule set 240 based on the initial rule set 140. Each of the application rule sets 240 includes, without limitation, a web application identifier (web app ID) 242 in addition to a status 242 for each of the rules 142 included in the initial rule set 140.

The web application identifier 242 uniquely identifies the associated web application 172. Each of the statuses 242 indicates whether the corresponding rule 142 is enabled or disabled for the associated web application 172. Notably, the response engine 210 initializes the statuses 242 to "enabled." In alternate embodiments, the response engine 210 may generate any number and type of application rule sets 240 and initialize the application rule sets 240 in any technically feasible fashion. For example, in some embodiments, the response engine 210 could receive multiple initial application rule sets instead of the initial rule set 140.

Subsequently, the response engine 210 performs filtering operations on the requests 130 received from the clients 120 and the responses 180 received from the web applications 172 based on the application rule sets 240. Upon receiving the request 130 or the response 180, the response engine 210 performs comparison operations between the associated web application 172 and the web application identifiers 244 to identify the associated application rule set 240.

For each status 242 in the associated application rule set 240 that equals "enabled," the response engine 210 applies the corresponding rule 142 to the request 130 or the response 180. First, the response engine 210 performs pattern matching operations between the corresponding rule 142 and the request 130 or the response 180. If the response engine 210 determines that the request 130 or the response 180 matches any of the rules 142 that are enabled for the associated web application 172, then the response engine 210 blocks the request 130 or the response 180. By contrast, if the response engine 210 determines that the request 130 or the response 180 does not match any of the rules 142 that are enabled for the associated web application 172, then the response engine 210 forwards the request 130 or the response 180.

As part of applying each of the enabled rules 142 to each of the requests 130 and the responses 180, the response engine 210 also performs logging operations. More precisely, the response engine 210 transmit traffic data 250 and filtering data 252 to the reputation engine 260. The traffic data 250 includes data associated with each of the requests 130 and each of the responses 180. The filtering data 252 includes data associated with the filtering operations performed by the response engine 210. Notably, the filtering data 252 indicates which of the requests 130 and the responses 180 hit each of the rules 142 and, consequently, were blocked by the response engine 210.

The reputation engine 260 generates client data 270 based on the traffic data 250 and the filtering data 252. As shown, the client data 270 includes, without limitation, client statuses 280. Each of the clients statuses 280 corresponds to a different client 120 and the number of the client statuses 280 equals the number of the clients 120. Each of the client statuses 280 includes, without limitation, a client identifier (ID) 282, hit data 284, and a reputation 286. The client identifier 282 uniquely identifies the corresponding client 120 in any technically feasible fashion.

The hit data 282 includes data that is associated with matches between enabled rules 142 and the traffic (i.e., the requests 130 and the responses 180) that are associated with the client 120. For each match, the hit data 282 specifies the rule 142, the associated web application 172, and the time of the request 130 or the response 180. In alternate embodiments, the reputation engine 260 may be configured to include any amount and type of data in the hit data 282 in any technically feasible fashion. Further, the reputation engine 260 may be configured to generate and store the hit data 282 in any technically feasible fashion. For instance, in some embodiments, the reputation engine 260 may be configured to continually generate and store the hit data 282 as the reputation engine 260 receives the traffic data 250 and the filtering data 252. Further, the reputation engine 260 may be configured to store the hit data 282 for any length of time (e.g., for 3 hours).

The reputation 286 specifies an estimated likelihood that the requests 130 and the responses 180 associated with the client 120 are legitimate. If the reputation 286 of the client 120 is relatively high, then the probability that the associated requests 130 and the associated responses 180 are legitimate is relative high. By contrast, if the reputation 286 of the client 120 is relatively low, then the probability that the associated requests 130 and the associated responses 180 are legitimate is relatively low. A relatively low reputation 286 may indicate undesirable behavior directly associated with the client 120 (e.g., the client is malicious) or undesirable behavior indirectly associated with the client 120 (e.g., the client is under the influence of a malicious entity).

The reputation engine 260 may compute the reputation 286 in any technically feasible fashion. For instance, in some embodiments, the reputation engine 260 computes the reputation 286 based on analyzing an access pattern associated with the client 120 during a proceeding interval of time (e.g., three hours). In operation, the reputation engine 260 initializes the reputation 286 to a relatively high value. For each request 130 or response 180 associated with the client 120 that hits an enabled rule 142, the reputation engine 260 decreases the reputation 286. Similarly, for each response 180 associated with the client 120 that specifies a client error status or a server error status, the reputation engine 260 decreases the reputation 286. By contrast, for each response 180 associated with the client 120 that specifies a success status, the reputation engine 260 increases the reputation 286.

In alternate embodiments, the reputation engine 260 may determine the reputations 286 in any technically feasible fashion and at any frequency. For instance, in some embodiments, the reputation engine 260 may continuously store the traffic data 250 and the filtering data 252 and may compute the reputations 286 of the clients 120 at a predetermined frequency. In other embodiments, the reputation engine 260 may determine the reputations 286 based on a whitelist or a blacklist and does not update the reputations 286 while the response engine 210 operates.

In alternate embodiments, the web application firewall subsystem 150 may implement any number of additional mechanisms to increase processing efficiency and/or provide custom handling for specific scenarios. For instance, in some embodiments, the reputation engine 260 may generate and maintain a "rule status data" that includes the hit data 284 to increase the efficiency of the web application firewall subsystem 150.

The update frequency 205 specifies a frequency with which the web application firewall subsystem 150 updates the application rule sets 240. The update frequency 205 may be generated and transmitted to the web application firewall subsystem 150 in any technically feasible fashion. For example, the update frequency 205 could be entered via a graphical user interface. Periodically, as per the update frequency 205, the fallibility engine 290 configures the response engine 210 to update the application rule sets 240 via an update process.

During the update process, for each of the web applications 272, the fallibility engine 290 computes a fallibility of each of the rules 242 for the web application 172. For example, if the initial rule set 140 includes 200 rules 242 and the system 100 includes 50 web applications 272, then the fallibility engine 290 computes 10000 different fallibilities. The fallibility of a given rule 142 for a given web application 172 estimates a likelihood that a corresponding hit is associated with legitimate traffic. If the fallibility is relatively high, then traffic associated with the web application 172 that hits the rule 142 is likely to be legitimate. By contrast, if the fallibility is relatively low, then traffic associated with the web application 172 that hits the rule 142 is likely to be malicious.

In general, the fallibility engine 290 may compute each fallibility in any technically feasible fashion based on any amount and type of the client data 270. For instance, in some embodiments, the fallibility engine 290 computes the fallibility based on an access pattern over a preceding interval of time (e.g., 3 hours). In operation, the fallibility engine 290 initializes the fallibility to a relatively high value. The fallibility engine 290 then identifies the clients 120 that are associated with the traffic to and from the web application 172 that hit the rule 142 over the interval of time based on the hit data 284. For each of the identified clients 120, the fallibility engine 290 updates the fallibility based on the reputation 286 of the client 120. If the reputation 286 is relatively high, then the fallibility engine 290 increases the fallibility. If the reputation 286 is relatively low, then the fallibility engine 290 decreases the fallibility. In other embodiments, the fallibility engine 290 may implement different heuristics to adjust the fallibility of each of the rules 142 for different access patterns. For example, if the rule 142(1) is hit at a relatively constant rate and the rule 142(2) is hit many times over a short period, then the fallibility engine 290 may adjust the associated fallibilities based on different heuristics.

In other embodiments, the fallibility engine 290 may perform any number and type of computations, pattern analysis, heuristic operations, learning operations, and the like, to determine the fallibilities. For example, in some embodiments, if the fallibility engine 290 determines that the request 130 from a client 120 with a relatively high reputation 286 hit more than one of the rules 252, then the fallibility engine 290 may dramatically increase the fallibility of each of the rules 252.

In alternate embodiments, the fallibilities of the rules 142 for the web applications 172 may be replaced with any quality scores associated with the rules 142 in any technically feasible fashion. Further, the fallibility engine 290 may be modified to compute the quality scores in any technically feasible fashion. For instance, in some embodiments, the fallibilities are replaced with reliabilities, and the fallibility engine 290 is modified to compute relaibilities of the rules 142 for the web applications 172.

For each fallibility, the fallibility engine 290 determines whether the fallibility exceeds a fallibility threshold. The fallibility engine 290 may receive the fallibility threshold in any technically feasible fashion. For example, the fallibility engine 290 could receive the fallibility threshold from a graphical user interface. If the fallibility engine 290 determines that the fallibility of the rule 142 for the web application 172 exceeds the fallibility threshold, then the fallibility engine 290 transmits a rule disable command 292 to the response engine 210. The rule disable command 292 specifies the rule 142 and the web application 172.

In alternate embodiments, the fallibility engine 290 may determine whether to disable each of the rules 242 for each of the web applications 172 in any technically feasible fashion. For instance, in some embodiments, to compute the fallibility of a given rule 142 for a given web application 172, the fallibility engine 290 assesses the client data 270 for the three proceeding time periods. First, the fallibility engine 290 identifies the clients 120 that are associated with the traffic to and from the web application 172 that hit the rule 142 based on the hit data 284. If, for each of the three proceeding time periods, the identified clients include at least two different clients 120 with relatively high reputations 282, then the fallibility engine 290 configures the response engine 210 to disable the rule 142 for the web application 172.

In various alternate embodiments, the fallibilities are replaced with quality scores and the fallibility engine 290 determines whether to disable each of the rules 242 for each of the web applications 172 in any technically feasible fashion that is consistent with the quality scores. For instance, in some alternate embodiments, the fallibilities may be replaced with accuracies. If the fallibility engine 290 determines that the accuracy of the rule 142 for the web application 172 is less than an accuracy threshold, then the fallibility engine 290 may transmit a rule disable command 292 to the response engine 210.

Upon receiving the rule disable command 292, the response engine 210 identifies the application rule set 240 that is associated with the web application 172 specified in the rule disable command 292. For the identified application rule set 240, the response engine 210 sets the status 242 that corresponds to the rule 142 specified in the rule disable command 292 equal to "disabled." While the status 242 is equal to "disabled," the response engine 210 does not perform any matching operations between the rule 142 and the requests 230 to or the responses 280 from the web application 172.

In alternate embodiments, the fallibility engine 290 may configure the response engine 210 to disable the rule 142 for the web application 172 in any technically feasible fashion. For instance, in some alternate embodiments, the fallibility engine 290 may generate a new application rule set 240 for the web application 172 that does not include the rule 142. The fallibility engine 290 may then transmit the new application rule set 240 to the response engine 210. In other embodiments, the fallibility engine 290 may perform additional operations that are designed to optimize web application filtering operations. For instance, in some embodiments, the fallibility engine 290 may generate a whitelist or a blacklist based on the reputations 286 and/or the fallibilities.

In some embodiments, the fallibility engine 290 may periodically configure the response engine 190 to re-enable the rule 142 that is disabled for the web application 172. Further, the fallibility engine 290 may reset the corresponding fallibility to a relatively low value. In this fashion, the fallibility engine 290 may retest the previously disabled rule 142 to re-estimate a likelihood that traffic associated with the web application 172 that hits the rule 142 is legitimate.

The descriptions of the various embodiments have been presented for purposes of illustration, but are not intended to be exhaustive or limited to the embodiments disclosed. Further, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to optimizing overall filtering operations for traffic associated with web applications based on estimating the effectiveness of previous filtering operations.

In various embodiments, the functionality of the web application firewall subsystem 150 is integrated into or distributed across any number (including one) of software applications that are stored and executed in any technically feasible fashion. For example, in some embodiments, the response engine 210 is included in a web application firewall application, and the reputation engine 260 and the fallibility engine 290 are included in an rule optimization application. Further, the web application firewall application could reside in one cloud or distributed computing system, while the rule optimization application could reside in a different cloud or distributed computing system. The response engine 210, the reputation engine 260, and the fallibility engine 290 described herein are not limited to any particular computing system and may be adapted to take advantage of new computing systems as they become available.

In some embodiments, any number of the web application firewall subsystem 150, the response engine 210, the reputation engine 260, and the fallibility engine 290 may be stored on computer readable media such as a CD-ROM, DVD-ROM, flash memory module, or other tangible storage media. Further, in some embodiments, the response engine 210, the reputation engine 260, and/or the fallibility engine 290 may be provided as an application program (or programs) stored on computer readable media such as a CD-ROM, DVD-ROM, flash memory module, or other tangible storage media.

Figure 3:
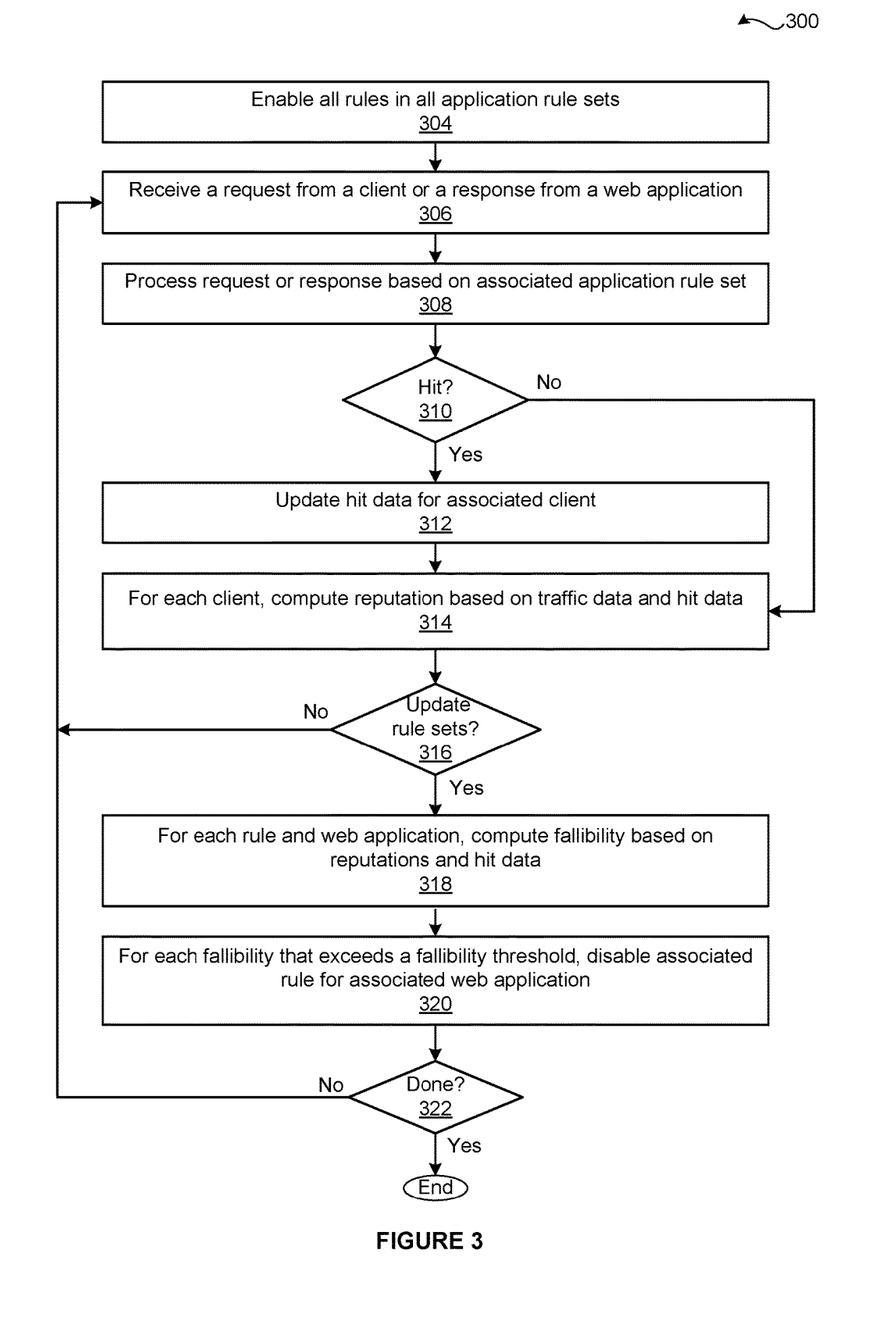
FIG. 3 is a flow diagram of method steps for configuring a rule set to protect web applications from on-line attacks, according to various embodiments of the present invention.

FIG. 3 is a flow diagram of method steps for configuring a rule set to protect web applications from on-line attacks, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 304, where the response engine 210 receives the initial rule set 140 and generates the application rule sets 240. More precisely, for each of the web applications 172, the response engine 210 generates an associated application rule set 240 that enables the rules 142 included in the initial rule set 140. At step 306, the response engine 210 receives the request 130 to access the web application 172 from the client 120 or the response 180 from the web application 172 to the client 120.

At step 308, the response engine 210 identifies the application rule set 240 that is associated with the request 130 or the response 180 and then processes the request 130 or the response 180 as per the identified application rule set 240. Notably, for each of the rules 142 that is enabled in the application rule set 240, the response engine 210 performs pattern matching operations between the rule 142 and the request 130 or the response 180.

If the response engine 210 determines that the request 130 or the response 180 hits (i.e., matches) any of the enabled rules 242, then the response engine 210 blocks the request 130 or the response 180. If, however, the response engine 210 determines that the request 130 or the response 180 does not hit any of the enabled rules 242, then the response engine 210 forwards the request 130 or the response 180 to, respectively, the web server 170 that hosts the web application 172 or the client 130. As part of step 308, the response engine 210 generates and transmits the traffic data 250 and the filtering data 252 to the reputation engine 260.

At step 310, the reputation engine 260 determines whether the filtering data 252 indicates that the request 130 or the response 180 hit any of the enabled rules 242. If, at step 310, the reputation engine 260 determines that the filtering data 252 indicates that the request 130 or the response 180 hit one or more of the enabled rules 242, then the method 300 proceeds to step 312. At step 312, the reputation engine 260 updates the hit data 284 included in the client status 280 associated with the client 120 based on the filtering data 252. If, however, at step 312, the reputation engine 260 determines that the filtering data 252 indicates that the request or the response 180 did not hit any of the enabled rules 242, then the method 300 proceeds directly to step 314.

At step 314, for each of the clients 120, the reputation engine 260 computes the reputation 286 based on the traffic data 250 and the hit data 284. The reputation engine 260 may compute the reputation 286 of a given client 120 in any technically feasible fashion. For instance, in some embodiments, the reputation engine 260 may compute the reputation 286 of the client 230 based on a ratio of successful traffic associated with the client 230 to blocked traffic associated with the client 230 over an interval of time.

At step 316, the web application firewall subsystem 150 determines whether to update the application rule sets 240. The web application firewall subsystem 150 may determine whether to update the application rule sets 240 in any technically feasible fashion. For instance, in some embodiments, the web application firewall subsystem 150 determines whether to begin an update cycle based on the update frequency 205. If, at step 316, the web application firewall subsystem 150 determines not to update the application rule sets 240, then the method 300 returns to step 306, where the response engine 210 receives and processes a new request 130 or a new response 180.

If, however, at step 316, the web application firewall subsystem 150 determines to update the application rule sets 240, then the method 300 proceeds to step 318. At step 318, for each of the rules 142 and each of the web applications 172, the fallibility engine 280 computes the fallibility of the rule 142 for the web application 172 based on the reputations 286 and the hit data 284. The fallibility engine 280 may compute the fallibilities in any technically feasible fashion. For example, the fallibility engine 280 could compute the fallibility of the rule 142 for the web application 172 based on the reputations 286 of the clients 230 associated with the traffic to and from the web application 172 that hit the rule 142 over an interval of time.

At step 320, for each of the fallibilities, the fallibility engine 280 determines whether the fallibility exceeds a fallibility threshold. If the fallibility of the rule 142 for the web application 172 exceeds the fallibility threshold, then the fallibility engine 280 configures the response engine 210 to disable the rule 142 for the web application 172. The fallibility engine 280 may configure the response engine 210 to disable the rule 142 for the web application 172 in any technically feasible fashion For instance, in some embodiments, the fallibility engine 280 transmits the corresponding rule disable command 292 to the response engine 210. Upon receiving the rule disable command 292, the response engine 210 sets the status 242 corresponding to the rule 142 in the application rule set 240 that is associated with the web application 172 to "disabled."

At step 322, the web application subsystem 150 determines whether to continue executing filtering operations. The web application subsystem 150 may determine whether to continue executing filtering operations in any technically feasible fashion. For example, the web application subsystem 150 could determine whether a power down sequence is in progress. If at step 322, the web application subsystem 150 determines to continue executing filtering operations, then the method 300 returns to step 306, where the response engine 210 receives and processes a new request 130 or a new response 180. Advantageously, the response engine 210 processes the new request 130 or the new response 180 based on the modified application rule sets 240 that reflect the rule disable commands 292. If, however, at step 322, the web application subsystem 150 determines not to continue executing filtering operations, then the method 300 terminates.

In sum, the disclosed techniques optimize rule sets that protect web applications from on-line attacks. A web application firewall subsystem includes a response engine, a reputation engine, and a fallibility engine. Initially, for each web application, the response engine creates an application-specific rule set that includes an enabled rule for each rule included in a set of initial rules. Subsequently, for each web application, the response engine performs filtering operations on requests from clients to the web application and responses from the web application based on the application-specific rule set. As the response engine operates, the response engine transmits traffic data and filtering data to the reputation engine. The traffic data specifies the requests and the responses, and the filtering data specifies the corresponding, completed filtering operations.

The reputation engine estimates reputations of the clients based on the traffic data and the filtering data. A high reputation indicates that the client is likely to be legitimate, while a low reputation indicates that the client is likely to be malicious. Periodically, for each enabled rule included in each application-specific rule set, the fallibility engine estimates a fallibility based on the reputations of the clients and the filtering data. A high fallibility indicates that traffic that matches the enabled rule is likely to be legitimate, while a low fallibility indicates that traffic that matches the enabled rule is not likely to be legitimate. If the fallibility of an enabled rule included in a web-applicable rule set exceeds a predetermined fallibility threshold, then the fallibility engine configures the response engine to disable the rule in the application-specific rule set.

Advantageously, the techniques described herein enable the fire wall subsystem to automatically and efficiently update application-specific rule sets to optimize the filtering operations executed by the web application firewall. More specifically, estimating the fallibilities of rules based on estimated reputations of clients and the filtering operations enables the fallibility engine to efficiently identify rules that are likely to match unacceptably high amounts of legitimate traffic. Subsequently, configuring the response engine to automatically disable the identified rules automatically reduces the number of legitimate requests and legitimate responses that are blocked by the response engine. By contrast, conventional techniques for optimizing rule sets typically require ongoing, time-consuming manual operations.

1. In some embodiments, a method for configuring a rule set to protect web applications from on-line attacks comprises identifying a first completed filtering operation associated with applying a first rule included in the rule set to a first request to access a web application received from a first client; computing a first quality score associated with the first rule based on the first completed filtering operation and a first reputation value indicating a likelihood that the first client is legitimate; determining that the first quality score indicates that the first rule does not satisfy a quality criterion; and disabling the first rule in the rule set to generate a second rule set.

2. The method of clause 1, wherein the first completed filtering operation comprises a blocking operation performed on either the first request or a response to the first request.

3. The method of clauses 1 or 2, wherein the first quality score estimates a likelihood that the first rule, when applied to a second request to access the web application or a response to the second request, incorrectly indicates that the second request or the second response is not legitimate.

4. The method of any of clauses 1-3, wherein computing the quality score comprises increasing an intermediate quality score associated with the first rule and at least a second client when the first reputation value indicates that the first client is legitimate, and decreasing the intermediate quality score when the first reputation value indicates that the first client is not legitimate.

5. The method of any of clauses 1-4, wherein both the first completed filtering operation and the first quality score are associated with a predetermined interval of time.

6. The method of any of clauses 1-5, further comprising, prior to computing the first quality score, computing the first reputation value based on at least a second request to access either the web application or a different web application received from the first client.

7. The method of any of clauses 1-6, wherein computing the first reputation value comprises identifying a second completed filtering operation associated with the second request, and decreasing an intermediate reputation value associated with the first client.

8. The method of any of clauses 1-7, wherein computing the first reputation value comprises identifying a response to the second request, and increasing an intermediate reputation value associated with the first client when the response to the second request is successful, and decreasing the intermediate reputation value associated with the first client when the response to the second request is not successful.

9. In some embodiments, a computer-readable storage medium including instructions that, when executed by a processor, configure the processor to perform the steps of identifying a first completed filtering operation associated with applying a first rule included in a rule set to a first request to access a web application received from a first client; computing a first quality score associated with the first rule based on the first completed filtering operation and a first reputation value indicating a likelihood that the first client is legitimate; determining that the first quality score indicates that the first rule does not satisfy a quality criterion; and disabling the first rule in the rule set to generate a second rule set.

10. The computer-readable storage medium of clause 9, wherein the first completed filtering operation comprises a blocking operation performed on either the first request or a response to the first request.

11. The computer-readable storage medium of clauses 9 or 10, wherein the first quality score estimates a likelihood that the first rule, when applied to a second request to access the web application or a response to the second request, incorrectly indicates that the second request or the second response is not legitimate.

12. The computer-readable storage medium of any of clauses 9-11, wherein both the first completed filtering operation and the first quality score are associated with a predetermined interval of time.

13. The computer-readable storage medium of any of clauses 9-12, further comprising, prior to computing the first quality score, computing the first reputation value based on at least a second request to access either the web application or a different web application received from the first client.

14. The computer-readable storage medium of any of clauses 9-13, wherein the first reputation value is based on at least one of a whitelist and a blacklist.

15. The computer-readable storage medium of any of clauses 9-14, wherein disabling the first rule in the rule set comprises transmitting a command to a web application firewall to disable the first rule with respect to the web application.

16. The computer-readable storage medium of any of clauses 9-15, further comprising, prior to computing the first quality score computing the first reputation value; determining that the first reputation value indicates that the first client is not legitimate; and adding the first client to a blacklist that is applied in conjunction with the rule set to protect the web application.

17. The computer-readable storage medium of any of clauses 9-16, further comprising, after a predetermined amount of time, re-enabling the first rule in the second rule set to generate a third rule set that tests whether the first rule is able to satisfy the quality criterion.

18. In some embodiments, a system comprises a memory storing a rule optimization application; and a processor that is coupled to the memory, wherein, when executed by the processor, the rule optimization application configures the processor to identify a first completed filtering operation associated with applying a first rule included in a rule set to a first request to access a web application received from a first client; compute a first quality score associated with the first rule based on the first completed filtering operation and a first reputation value indicating a likelihood that the first client is legitimate; determine that the first quality score indicates that the first rule does not satisfy a quality criterion; and disable the first rule in the rule set to generate a second rule set.

19. The system of claim 18, wherein the first completed filtering operation comprises a blocking operation performed on either the first request or a response to the first request.

20. The system of claim 18 or 19, wherein the first quality score estimates a likelihood that the first rule, when applied to a second request to access the web application or a response to the second request, incorrectly indicates that the second request or the second response is not legitimate.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for configuring a rule set to protect web applications from on-line attacks, the method comprising:
   identifying a first completed filtering operation associated with applying a first rule included in the rule set to a first request to access a web application received from a first client;
   computing a first quality score associated with the first rule based on the first completed filtering operation and a first reputation value indicating a likelihood that the first client is legitimate;
   determining that the first quality score indicates that the first rule does not satisfy a quality criterion; and
   disabling the first rule in the rule set to generate a second rule set.

2. The computer-implemented method of claim 1, wherein the first completed filtering operation comprises a blocking operation performed on either the first request or a response to the first request.

3. The computer-implemented method of claim 1, wherein the first quality score estimates a likelihood that the first rule, when applied to a second request to access the web application or a response to the second request, incorrectly indicates that the second request or the second response is not legitimate.

4. The computer-implemented method of claim 3, wherein computing the quality score comprises increasing an intermediate quality score associated with the first rule and at least a second client when the first reputation value indicates that the first client is legitimate, and decreasing the intermediate quality score when the first reputation value indicates that the first client is not legitimate.

5. The computer-implemented method of claim 1, wherein both the first completed filtering operation and the first quality score are associated with a predetermined interval of time.

6. The computer-implemented method of claim 1, further comprising, prior to computing the first quality score, computing the first reputation value based on at least a second request to access either the web application or a different web application received from the first client.

7. The computer-implemented method of claim 6, wherein computing the first reputation value comprises identifying a second completed filtering operation associated with the second request, and decreasing an intermediate reputation value associated with the first client.

8. The computer-implemented method of claim 6, wherein computing the first reputation value comprises identifying a response to the second request, and increasing an intermediate reputation value associated with the first client when the response to the second request is successful, and decreasing the intermediate reputation value associated with the first client when the response to the second request is not successful.

9. A computer-readable storage medium including instructions that, when executed by a processor, configure the processor to perform the steps of:
   identifying a first completed filtering operation associated with applying a first rule included in a rule set to a first request to access a web application received from a first client;
   computing a first quality score associated with the first rule based on the first completed filtering operation and a first reputation value indicating a likelihood that the first client is legitimate;
   determining that the first quality score indicates that the first rule does not satisfy a quality criterion; and
   disabling the first rule in the rule set to generate a second rule set.

10. The computer-readable storage medium of claim 9, wherein the first completed filtering operation comprises a blocking operation performed on either the first request or a response to the first request.

11. The computer-readable storage medium of claim 9, wherein the first quality score estimates a likelihood that the first rule, when applied to a second request to access the web application or a response to the second request, incorrectly indicates that the second request or the second response is not legitimate.

12. The computer-readable storage medium of claim 9, wherein both the first completed filtering operation and the first quality score are associated with a predetermined interval of time.

13. The computer-readable storage medium of claim 9, further comprising, prior to computing the first quality score, computing the first reputation value based on at least a second request to access either the web application or a different web application received from the first client.

14. The computer-readable storage medium of claim 9, wherein the first reputation value is based on at least one of a whitelist and a blacklist.

15. The computer-readable storage medium of claim 9, wherein disabling the first rule in the rule set comprises transmitting a command to a web application firewall to disable the first rule with respect to the web application.

16. The computer-readable storage medium of claim 9, further comprising, prior to computing the first quality score:
   computing the first reputation value;
   determining that the first reputation value indicates that the first client is not legitimate; and
   adding the first client to a blacklist that is applied in conjunction with the rule set to protect the web application.

17. The computer-readable storage medium of claim 9, further comprising, after a predetermined amount of time, re-enabling the first rule in the second rule set to generate a third rule set that tests whether the first rule is able to satisfy the quality criterion.

18. A system comprising:
   a memory storing a rule optimization application; and
   a processor that is coupled to the memory, wherein, when executed by the processor, the rule optimization application configures the processor to:
      identify a first completed filtering operation associated with applying a first rule included in a rule set to a first request to access a web application received from a first client;
      compute a first quality score associated with the first rule based on the first completed filtering operation and a first reputation value indicating a likelihood that the first client is legitimate;
      determine that the first quality score indicates that the first rule does not satisfy a quality criterion; and
      disable the first rule in the rule set to generate a second rule set.

19. The system of claim 18, wherein the first completed filtering operation comprises a blocking operation performed on either the first request or a response to the first request.

20. The system of claim 18, wherein the first quality score estimates a likelihood that the first rule, when applied to a second request to access the web application or a response to the second request, incorrectly indicates that the second request or the second response is not legitimate.

* * * * *